(12) United States Patent
Carter

(10) Patent No.: US 8,348,220 B2
(45) Date of Patent: Jan. 8, 2013

(54) PORTABLE CEILING FAN MOUNTING ASSEMBLY

(76) Inventor: Lee Carter, Howell, NJ (US)

( * ) Notice: Subject to any disclaimer, the term of this patent is extended or adjusted under 35 U.S.C. 154(b) by 316 days.

(21) Appl. No.: 12/884,295

(22) Filed: Sep. 17, 2010

(65) Prior Publication Data

US 2012/0068042 A1 Mar. 22, 2012

(51) Int. Cl.
*F16M 11/00* (2006.01)
(52) U.S. Cl. .......... 248/674; 248/224.7; 248/231.9; 416/244 R; 439/252; 439/542
(58) Field of Classification Search .......... 248/674, 248/447.1, 475.1, 213.2, 220.21, 224.7, 231.9, 248/231.91, 342; 416/5, 244 R, 246; 439/211, 439/252, 542, 571
See application file for complete search history.

(56) References Cited

U.S. PATENT DOCUMENTS

| | | | |
|---|---|---|---|
| 447,832 A | 3/1891 | Kintz | |
| 1,636,278 A | 7/1927 | Benjamin | |
| 2,667,571 A | 1/1954 | Versen | |
| 2,699,311 A | 1/1955 | Monson | |
| 2,766,434 A | 10/1956 | Gear | |
| 3,022,034 A | 2/1962 | Purdy | |
| 3,638,168 A | 1/1972 | Robbins | |
| 4,459,650 A * | 7/1984 | Pike | 362/427 |
| 4,713,734 A | 12/1987 | DeKay | |
| 4,810,207 A | 3/1989 | Butterfield | |
| 5,149,042 A | 9/1992 | Dumais | |
| 5,273,402 A * | 12/1993 | Maury | 416/246 |
| 5,349,975 A | 9/1994 | Valdner | |
| 5,522,704 A * | 6/1996 | Casteel | 416/246 |
| 5,567,117 A | 10/1996 | Gunn et al. | |
| 5,845,886 A | 12/1998 | McCormick | |
| 6,367,750 B1 * | 4/2002 | Ford | 248/208 |
| 6,464,524 B1 | 10/2002 | Kerr, Jr. et al. | |
| 6,616,112 B1 | 9/2003 | Tseng | |
| 6,780,049 B1 | 8/2004 | D'Angelo et al. | |
| 6,821,089 B2 | 11/2004 | Bilskie | |
| 7,064,269 B2 * | 6/2006 | Smith | 174/50 |
| 2007/0001072 A1 * | 1/2007 | Recknagel et al. | 248/200 |

* cited by examiner

*Primary Examiner* — Bradley Duckworth
(74) *Attorney, Agent, or Firm* — Gertner Mandel & Peslak; Arthur M. Peslak

(57) ABSTRACT

A portable ceiling fan mounting assembly adapted for use on the exterior of a parked motorized recreational vehicle is disclosed. The assembly includes an arm to which the ceiling fan and bracket for the fan is mounted. The arm has an electrical plug disposed on one end that connects the ceiling fan assembly electrically to the available power in the recreational vehicle. A mounting plate is attached to the recreational vehicle wall which receives the arm and contains an electrical receptacle for receipt of the electrical plug. The device is thus easy to handle and install and is user friendly.

4 Claims, 6 Drawing Sheets

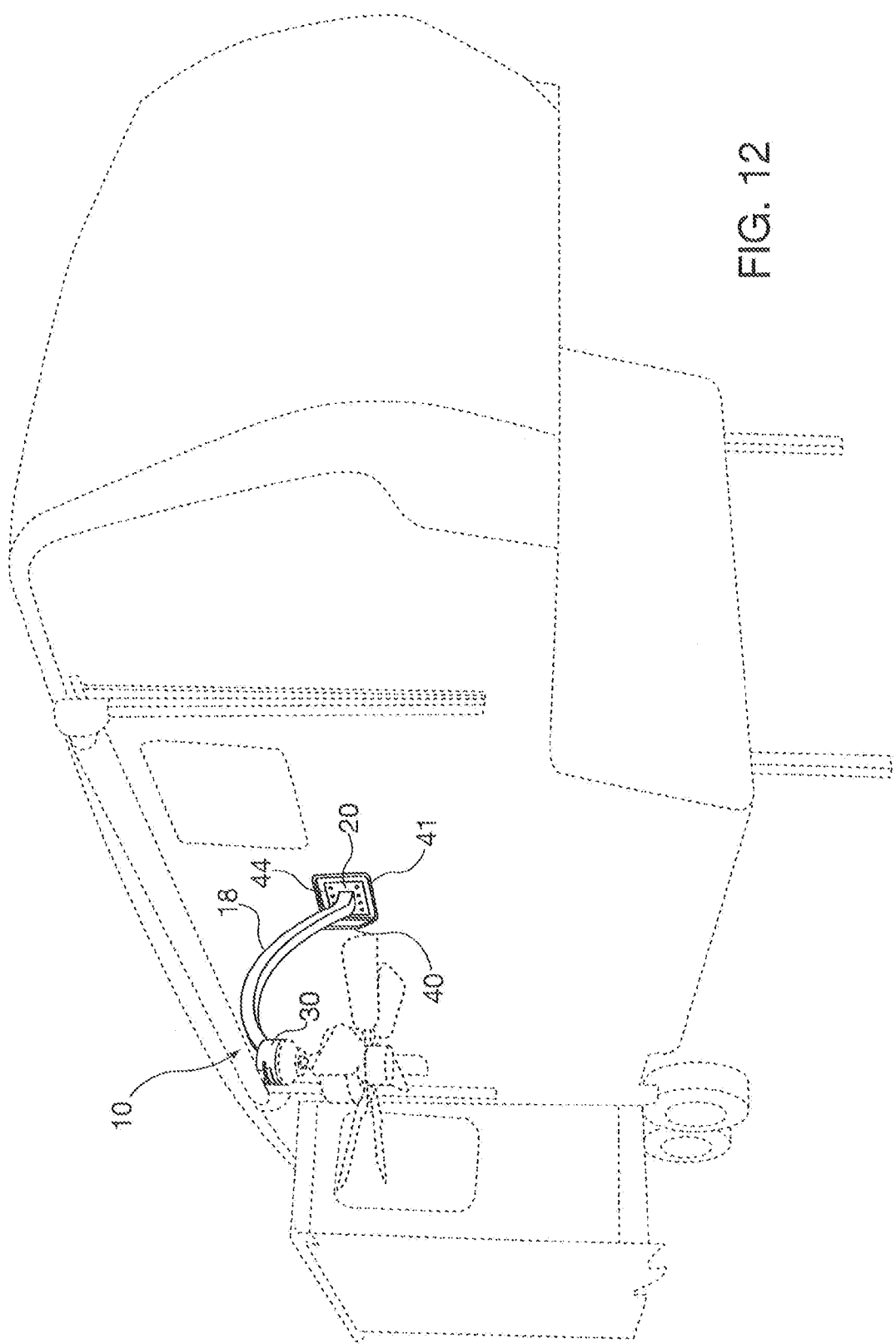

PORTABLE CEILING FAN MOUNTING ASSEMBLY

BACKGROUND OF THE INVENTION

The present invention is directed to the field of portable ceiling fans. In particular, the present invention is directed to a portable ceiling fan that can be removably installed on the exterior of a recreational vehicle. Typically, the portable ceiling fan would be installed under an awning on the recreational vehicle.

Recreational vehicle users typically enjoy sitting outside of their vehicle. However, when the outside temperatures are high, the heat and lack of air flow can force the users inside the vehicle. An object of the present invention is to provide a means to mount the fan on the exterior of the vehicle and create abundant air flow so the users can remain outside during warm weather.

There is currently a dearth of portable ceiling fans that can be easily installed and removed from the exterior of a recreational vehicle. The available portable fans are bulky and difficult to handle and install. The primary object of the present invention is to provide a portable ceiling fan that is easy to handle and simple to install to the exterior of a recreational vehicle.

SUMMARY OF THE INVENTION

A portable ceiling fan mounting assembly comprising a ceiling fan mounting bracket to which a portable ceiling fan is connected comprising a first electrical connector for delivery of electrical power to the ceiling fan and a device for mounting the ceiling fan thereto; a hollow support arm with a first end and a second end comprising a fan support on the first end wherein the fan support comprises a flat plate with a second electrical connector protruding therefrom whereby the flat plate slidingly receives the ceiling fan and mounting bracket and the first electrical connector is thereby caused to contact the second electrical connector; an electrical plug disposed in the second end of the hollow arm; electrical wires disposed in the hollow arm to electrically connect the electrical plug to the second electrical connector; and a wall mounting assembly disposed on an exterior wall of a recreational vehicle comprising a hinged door and frame, a mounting plate fastened inside the frame and a receiving tube with an electrical receptacle disposed therein whereby the hollow support arm is reversibly mounted in the mounting plate at its second end and the electrical plug is thereby inserted into the electrical receptacle.

BRIEF DESCRIPTION OF THE DRAWINGS

FIG. 12 is a plan view illustrating the installation of the present invention.

DETAILED DESCRIPTION OF THE INVENTION

Figure 1:
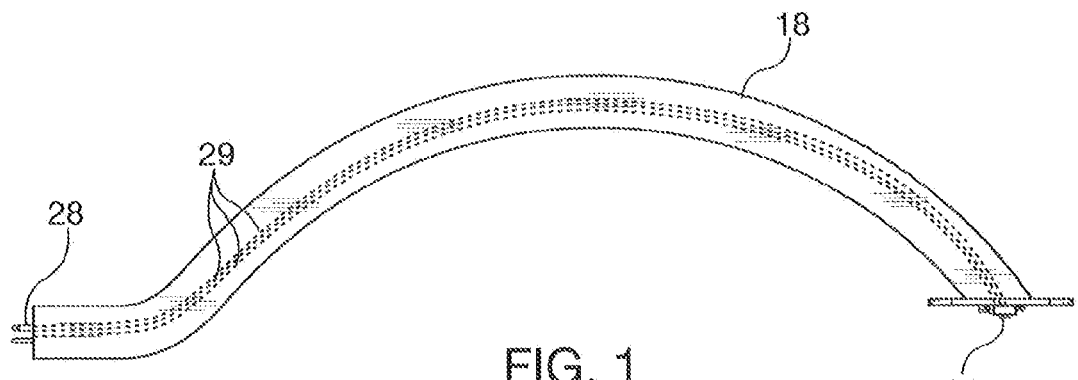
FIG. 1 is a side view of a component of the present invention.
Figure 2:
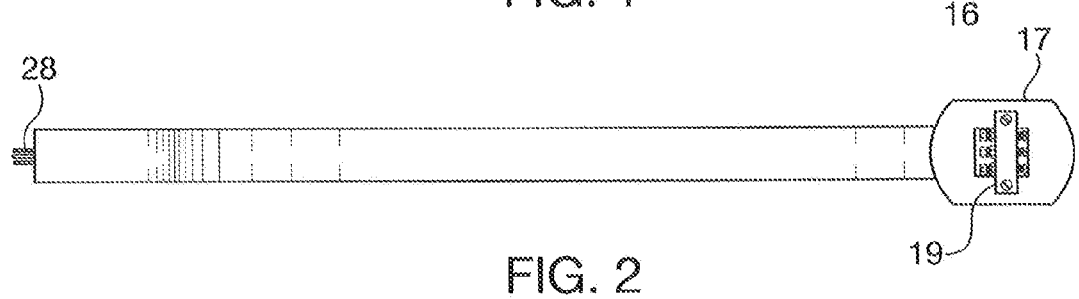
FIG. 2 is a bottom view of the component shown in FIG. 1.
Figure 3:
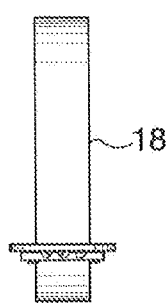
FIG. 3 is a partial side view of the component shown in FIG. 1.
Figure 4:
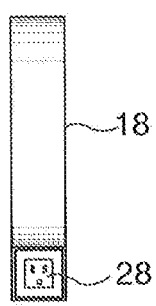
FIG. 4 is a partial rear view of the component shown in FIG. 1.

The present invention will now be described in terms of the presently preferred embodiment thereof as illustrated in the drawings. Those of ordinary skill in the art will recognize that many obvious modifications may be made thereto without departing from the spirit or scope of the present invention.

The present invention is directed to a portable ceiling fan assembly 10. The portable ceiling fan assembly 10 is meant to be easily stored and transported in the interior of a motorized recreational vehicle for use when needed. Although the present embodiment is described in conjunction with a motorized recreational vehicle, the invention can also be applied to a travel trailer or fifth wheel trailer that are towed behind a separate vehicle. However, when the recreational vehicle is parked, the portable ceiling fan assembly 10 is adapted to be installed on an exterior wall of the recreational vehicle. Thus, the users can sit under the fan and enjoy the comforts of the moving air.

The portable ceiling fan assembly 10 comprises a ceiling fan 12. The ceiling fan 12 is a conventional commercially available ceiling fan that is adapted for use in the present invention. The ceiling fan 12 comprises a housing 14. The housing 14 is adapted to be received on a fan mounting bracket 30. The fan mounting bracket 30 is connected to a fan support 16 that is in turn connected to an end of a support arm 18. These components are illustrated in the drawings and described in detail below.

Figure 10:
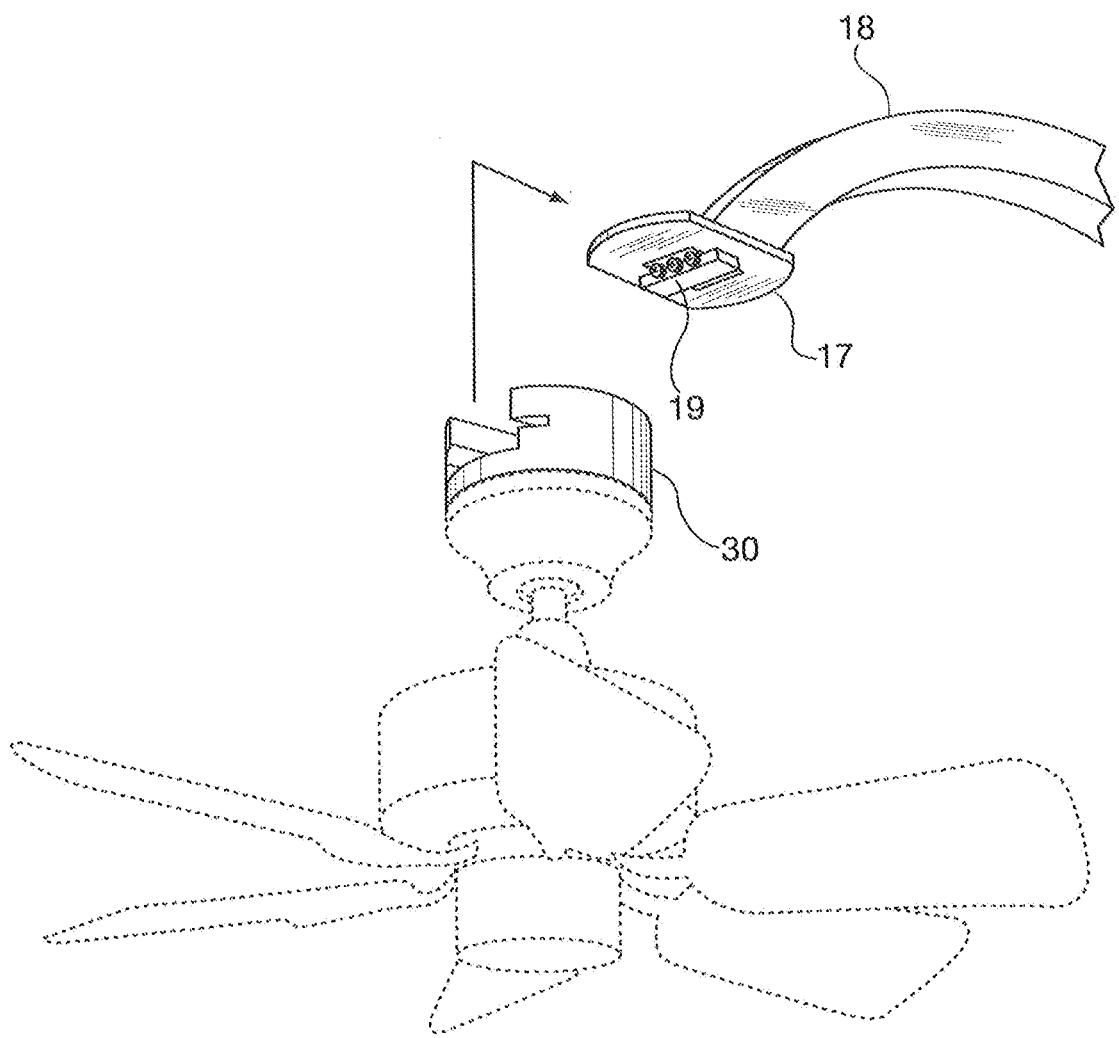
FIG. 10 is a plan view of the present invention.
Figure 11:
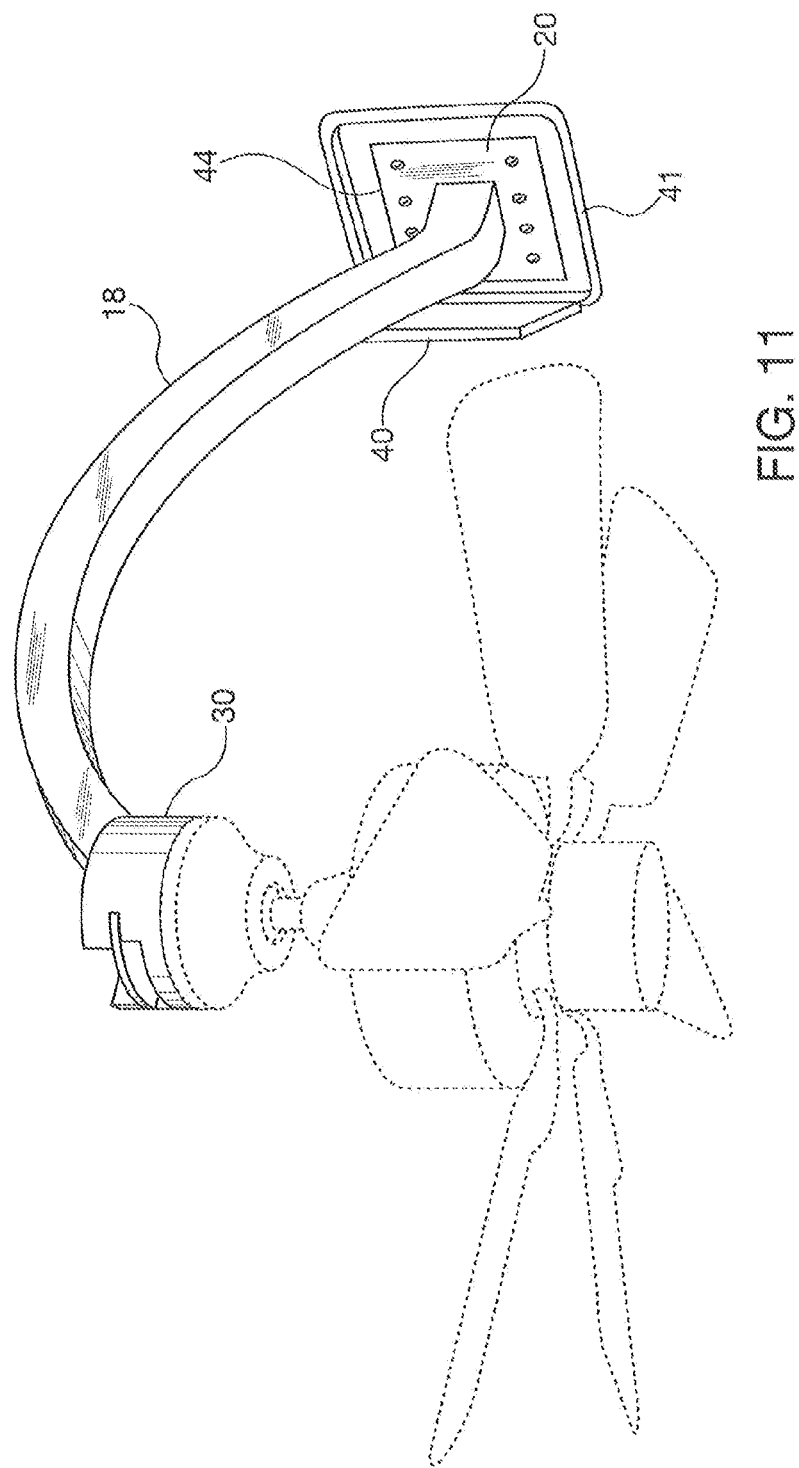
FIG. 11 is a plan view illustrating a typical installation of the present invention.

The support arm 18 is hollow with a semi-circular arc as shown in FIG. 1. The support arm 18 is adapted to support the ceiling fan 12 from the outside wall of the recreational vehicle. The support arm 18 is adapted to be received in a wall mounting assembly 20 on the exterior wall of the recreational vehicle. The support arm 18 comprises the fan support 16 on the end where the ceiling fan 12 will be mounted. The wall mounting assembly 20 comprises a plate 21, a plurality of through holes 22 in the plate 21 and a receiving tube 23. The through holes 22 are adapted to receive fasteners 24 for connecting the wall mounting assembly 20 to the outside wall of the recreational vehicle is shown in FIGS. 10 and 11. The support arm 18 is slidingly received in a receiving tube 23 in the wall support assembly 20. A male electrical plug 28 is disposed near the end of the interior of support arm 18. The male electrical plug 28 is adapted to be received in a mating female electrical receptacle 44 that is mounted from the interior wall of the recreational vehicle.

Figure 6:
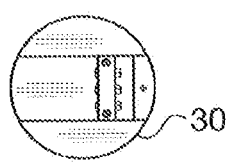
FIG. 6 is a partial bottom view of the component shown in FIG. 5.
Figure 7:
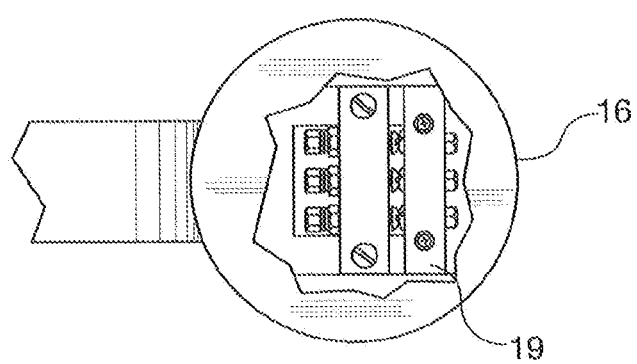
FIG. 7 is a top view of the component shown in FIG. 5.
Figure 8:
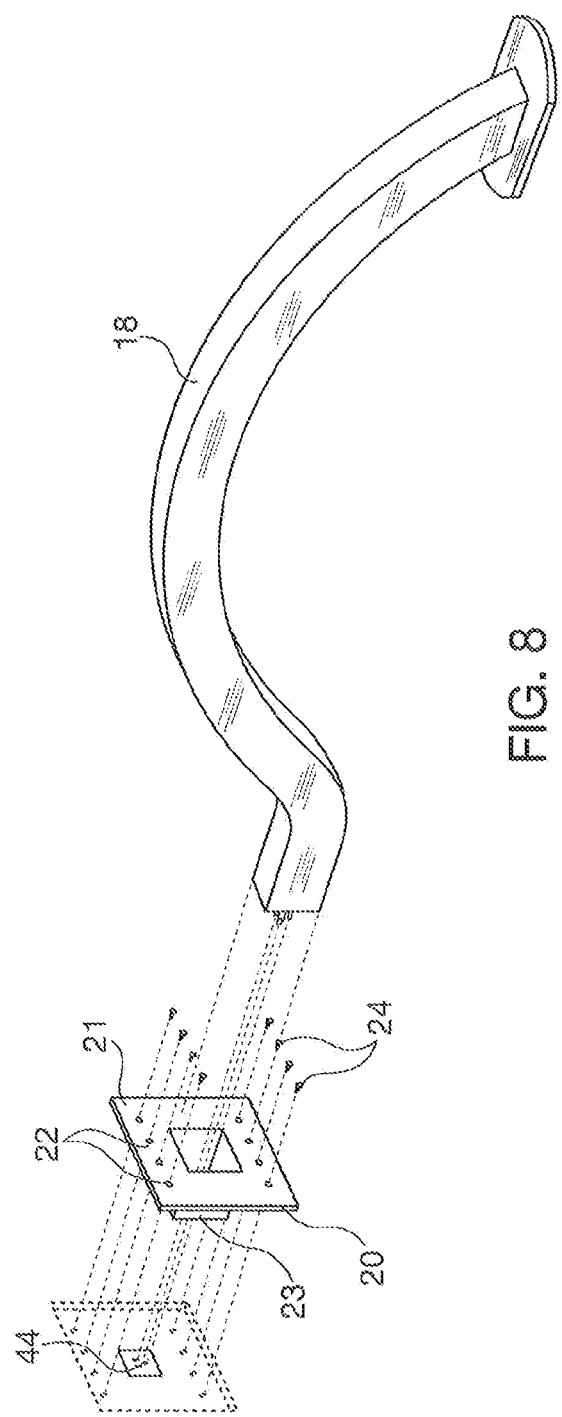
FIG. 8 is a partial exploded view of the present invention.
Figure 9:
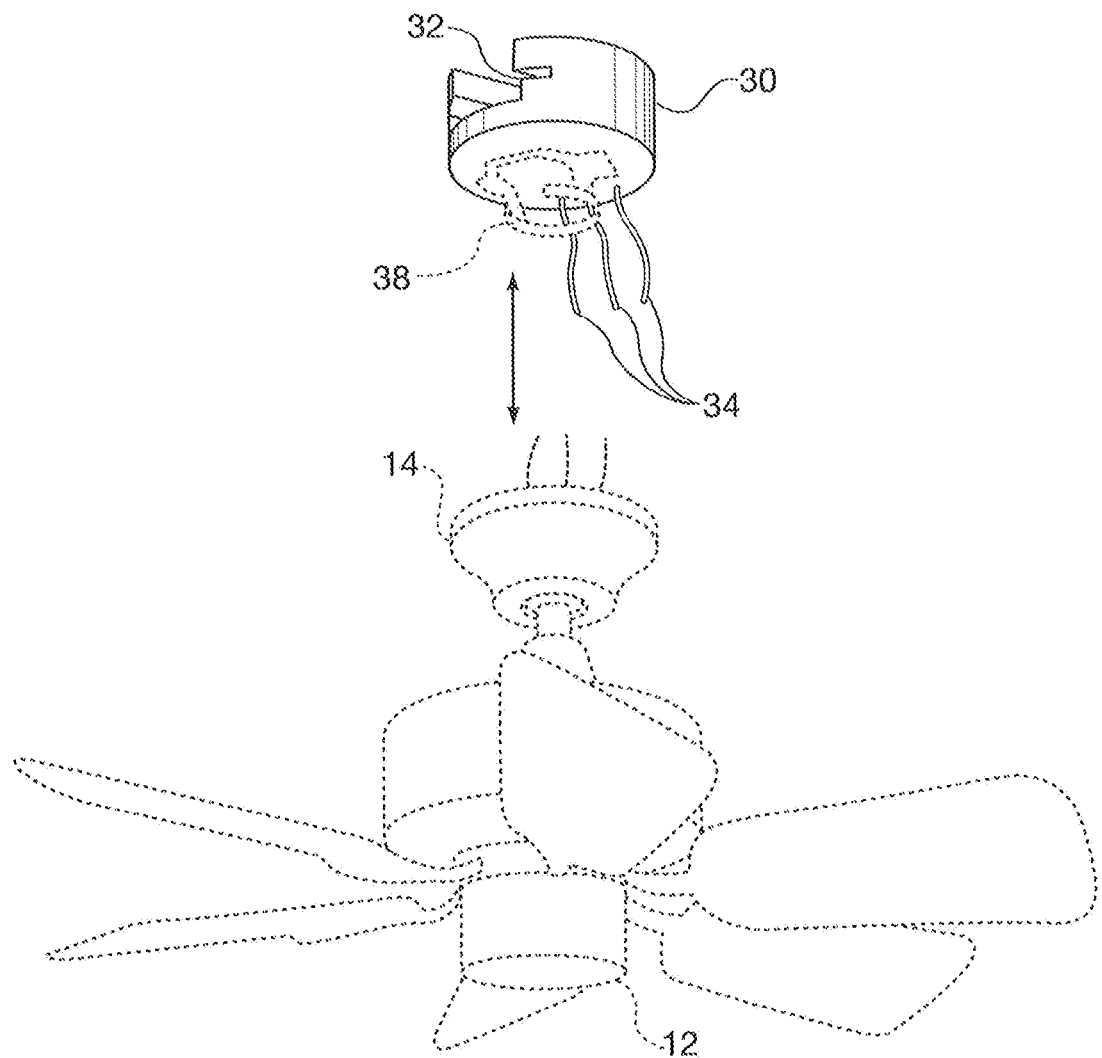
FIG. 9 is a partial exploded assembly view of the present invention.

The fan support bracket 16 is illustrated in FIGS. 6 and 7. The fan support bracket 16 comprises a support plate 17 and an electrical connector 19. The electrical connector 19 protrudes from the surface of the support plate 17. Electrical wires 29 are disposed in the interior of the support arm 18 and connected to the male electrical plug 28 on one end and the electrical connector 19 on the other end.

Figure 5:
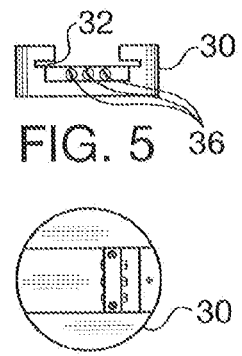
FIG. 5 is a side view of a component of the present invention.

The fan mounting bracket 30 is illustrated in FIG. 5. The fan mounting bracket 30 is adapted to he received in the fan support bracket 16. The fan mounting bracket 30 is generally cylindrical in shape with an open slot 32. The open slot 32 is adapted to be slidingly received on the support plate 17. Electrical connecting wires 34 from the ceiling fan 12 terminate in the electrical terminals 36 as shown in FIG. 5. The ceiling fan 12 is connected to the fan mounting bracket 30 at the second fan mounting bracket 38.

After the ceiling fan 12 is connected to the fan mounting bracket 30, the fan is placed into the fan support bracket 16 by sliding the open slot 32 over the support plate 17. At that point, the terminals 36 come into physical and electrical contact with the electrical connector 19. The electrical connector 19 is electrically connected to the male electrical plug 28 by means of the electrical wires 29 in the interior of the support arm 18. The ceiling fan 12 thus receives power from the recreational vehicle by means of these electrical connections.

On the exterior of the wall of the recreational vehicle, a hinged door 40 with frame 41 is mounted around the wall mounting assembly 20. The female electrical receptacle 44 which supplies power to the ceiling fan 12 is mounted on the interior wall and is disposed inside the receiving tube 23.

In practice, the door 40 is opened exposing the female electrical connector. The ceiling fan assembly 10 is placed inside the door and frame and into the receiving tube 23 as described herein. The male electrical connector 28 is inserted into the female electrical receptacle 44 by inserting the end of the arm 18 with the male electrical plug 28 into the receiving tube 23. The ceiling fan assembly 10 is then secured in place on the wall of the recreational vehicle and is ready for use. The ceiling fan assembly 10 can be easily installed and removed as necessary.

Those of ordinary skill in the art will recognize the foregoing merely illustrates an embodiment of the present invention and that many obvious modifications may be made thereto without departing from the spirit or scope of the present invention as set forth in the appended claims.

What is claimed is:

1. A portable ceiling fan mounting assembly comprising:
   (a) a ceiling fan mounting bracket to which a portable ceiling fan is connected comprising a first electrical connector for delivery of electrical power to the ceiling fan and a device for mounting a fan support thereto;
   (b) a hollow support arm with a first end and a second end comprising the fan support on the first end wherein the fan support comprises a flat plate with a second electrical connector protruding therefrom whereby the flat plate slidingly receives the ceiling fan and mounting bracket and the first electrical connector is thereby caused to contact the second electrical connector;
   (c) an electrical plug disposed in the second end of the hollow arm;
   (d) electrical wires disposed in the hollow arm to electrically connect the electrical plug to the second electrical connector; and
   (e) a wall mounting assembly disposed on an exterior wall of a recreational vehicle comprising a hinged door and frame, a mounting plate fastened inside the frame and a receiving tube with an electrical receptacle disposed therein whereby the hollow support arm is reversibly mounted in the mounting plate at its second end and the electrical plug is thereby inserted into the electrical receptacle.

2. The portable ceiling fan mounting assembly of claim 1 wherein the device for mounting the fan support to the ceiling fan mounting bracket is an open slot disposed on the ceiling fan mounting bracket.

3. portable ceiling fan mounting assembly of claim 2 wherein the flat plate is slidingly received in the open slot.

4. The portable ceiling fan mounting assembly of claim 1 wherein the hollow arm comprises a semi-circular arc.

\* \* \* \* \*